US008660117B2

(12) United States Patent
Janssen et al.

(10) Patent No.: US 8,660,117 B2
(45) Date of Patent: Feb. 25, 2014

(54) PACKET SWITCHING DEVICE AND LOCAL COMMUNICATION NETWORK WITH SUCH A PACKET SWITCHING DEVICE

(75) Inventors: Dirk Janssen, Verl (DE); Holger Buettner, Berlin (DE); Hans Beckhoff, Verl (DE)

(73) Assignee: Beckhoff Automation, GmbH, Verl (DE)

( * ) Notice: Subject to any disclaimer, the term of this patent is extended or adjusted under 35 U.S.C. 154(b) by 436 days.

(21) Appl. No.: 12/579,454

(22) Filed: Oct. 15, 2009

(65) Prior Publication Data

US 2010/0111082 A1 May 6, 2010

Related U.S. Application Data

(63) Continuation of application No. PCT/EP2008/054613, filed on Apr. 16, 2008.

(30) Foreign Application Priority Data

Apr. 16, 2007 (DE) .......................... 10 2007 017 835

(51) Int. Cl.
*H04L 12/28* (2006.01)

(52) U.S. Cl.
USPC ............................ 370/389; 370/400; 709/251

(58) Field of Classification Search
None
See application file for complete search history.

(56) References Cited

U.S. PATENT DOCUMENTS

| 5,255,268 | A | * | 10/1993 | Cato et al. ...................... 370/405 |
| 6,154,462 | A | * | 11/2000 | Coden ........................... 370/403 |
| 6,236,640 | B1 | * | 5/2001 | Klink ............................ 370/224 |
| 6,647,429 | B1 | * | 11/2003 | Semal ........................... 709/251 |
| 7,509,300 | B2 | * | 3/2009 | Sahni et al. ........................... 1/1 |
| 2002/0064157 | A1 | | 5/2002 | Krause |
| 2003/0058790 | A1 | * | 3/2003 | Nagamine ..................... 370/222 |
| 2003/0072259 | A1 | * | 4/2003 | Mor .............................. 370/223 |
| 2006/0212604 | A1 | | 9/2006 | Beckhoff et al. |

FOREIGN PATENT DOCUMENTS

| DE | 101 23 821 | 12/2001 |
| DE | 10123821 | 12/2001 |
| DE | 100 58 524 | 6/2002 |
| DE | 10249851 | 5/2004 |
| DE | 103 04 637 | 8/2004 |
| DE | 10304637 | 8/2004 |
| WO | WO 99/09713 | 2/1999 |
| WO | WO-9909713 | 2/1999 |

* cited by examiner

*Primary Examiner* — Brian Roberts
(74) *Attorney, Agent, or Firm* — Dorsey & Whitney LLP (57) ABSTRACT

A packet switching device comprises a network interface configured to send and receive data packets via a communication network, a plurality of string interfaces configured to transmit and receive data packets to/from a plurality of participants and a switching unit connected to the network interface and to the plurality of string interfaces. The a switching unit comprises a control unit configured to control a data throughput. The control unit comprises an interface association table which determines that data packets received via the network interface are mandatorily outputted via the string interfaces and the data packets received via the string interfaces are mandatorily outputted via the network interface.

14 Claims, 4 Drawing Sheets

PACKET SWITCHING DEVICE AND LOCAL COMMUNICATION NETWORK WITH SUCH A PACKET SWITCHING DEVICE

This application is a Continuation of PCT Application No. PCT/EP2008/054613, filed Apr. 16, 2008, which claims priority to German Application No. DE 10 2007 017 835.4, filed Apr. 16, 2007, both of which are incorporated herein by reference.

FIELD

The present invention generally relates to a packet switching device and to a local communication network comprising such a packet switching device.

BACKGROUND

Local communication networks, so-called "local area networks" (LANs), are restricted to a geographical area and consist of one or a plurality of servers and workstations, so-called nodes, which are connected to each other via a communication line network such as a coaxial cable, a glass-fibre cable or a twisted-pair cable. Various types of network topologies, such as bus, star or tree structures, are possible for LANs. LANs are operated by means of a network operating system and a network protocol.

Currently, the most widespread standard for a LAN network protocol is the Ethernet. By means of the Ethernet, data may currently be transmitted at a rate of up to 100 Mbits per second (Mbps). In the OSI layer model, the international reference model for data transmission in networks which is made up of a stack of seven layers whereby an amount of protocols is defined for each layer which allocate their services to the respective next higher level, the Ethernet is allocated to the second layer, the so-called conductor layer. In this conductor layer the data to be transmitted are bundled to form packets to which specific information for the respective communication protocol is added. Within the network, the conductor layer is responsible for transmitting the data packets from node to node as well as for error detection. Thereby, the Ethernet supports various types of communication protocols, such as the TCP/IP protocol or the IPX protocol.

In the Ethernet concept, the conductor layer is divided up into two levels, whereby the first level adds a so-called header to the data, the header comprising information required by the receiver protocol for a correct data transmission. In the second level of the Ethernet protocol, the data packets are then encapsulated by means of an additional header and a further end section, a so-called trailer, for transporting the data packets form node to node. By means of such Ethernet data packets, so-called Ethernet telegrams, data having a length of up to 1500 bytes may be transmitted.

The Ethernet furthermore determines the access method defining how the individual nodes may utilize and occupy the physical connection paths of the network. Thereby, the Ethernet operates according to the so-called carrier sense multiple access/collision detect method (CSMA/CD). In this access method, the node ready for sending checks whether the transmission path is free prior to sending. Then, the data are transmitted. As all nodes may send their data at the same time, collisions may occur. The node noticing the collision will then interrupt transmission. In order to avoid that two nodes start sending with only a small time delay, all sending nodes generate a so-called JAM signal so that all nodes located at the transmission path interrupt the processing of the currently transmitted data packet so as not to disturb transmission.

The Ethernet protocol is predominantly used for office communication networks. Due to the advantages of the Ethernet concept in the use of standard hardware and software components and due to the possibility of achieving high data transmission rates even in the case of a simple network technology, a demand exists for being able to utilize the Ethernet network communication in industrial manufacturing, as well, in order to exchange data and carry out control tasks. Currently, the Ethernet protocol, however, only allows for limited use in automation technology, in particular due to the lack of real-time functionality. For controlling machines it is necessary that a cyclic processing of the control task follows without time fluctuations, i.e. with only a small deviation from the desired cycle time in the range of a few microseconds, the reaction to the control demand occurring within a foreseeable reply time. The CSMA/CD access method used by the Ethernet, however, does not guarantee such fixed reaction times. In the case of a strong net load, the used access method may actually be responsible for the fact that Ethernet telegrams cannot be transmitted for a certain amount of time, so that a guaranteed reply time to a control demand cannot be safeguarded.

In order to still be able to achieve a certain amount of real time in Ethernet networks, such Ethernet networks are frequently configured as star topologies using a packet switching device, a so-called switch. Thereby, each node which will be referred to as participant in the following comprises a point-to-point connection to the network switch. Such a network topology consisting of point-to-point connections between participants and the central switch, however, requires complex cabling and thus involves high costs.

The switch examines each Ethernet telegram circling in the network for the address of the addressed participant and then forwards the Ethernet telegram to the addressed participant via the corresponding point-to-point connection. Thereby, switches usually operate in such a way that they gradually learn by means of the addresses which participants are located at which switch interface. By means of the thus generated dynamic address table within the switch it is decided upon receipt of an Ethernet telegram to which interface the Ethernet telegram is to be transmitted. However, if no address entry exists for the target address of the received Ethernet telegram within the switch or the received Ethernet telegram is a multicast or broadcast telegram, respectively, the received Ethernet telegram is transmitted via all interfaces.

With regard to the transmitting order, the switches usually employ the FIFO concept in which the Ethernet telegrams which were received first are also sent first. However, this prevents reliable real-time processing of the Ethernet telegrams. More current switches thus support the so-called VLAN tagging in which individual Ethernet telegrams are prioritized during transmission in order to guarantee a real-time functionality. Moreover, switches are known which transmit Ethernet telegrams at predetermined points in time due to protocol-specific identifications in order to allow for real time processing. Due to the requirement for protocol-specific identifications, however, such switches are only able to process Ethernet telegrams generated according to the respective protocol. Contrary thereto, Ethernet telegrams generated by means of other Ethernet protocols cannot be switched in a time-controlled manner in order to guarantee real-time processing.

For the known switches, however, a number of scenarios are in principle conceivable in which a real time functionality, in which the Ethernet telegram must be reliably transmitted within a predetermined time, cannot be guaranteed. The known switches always carry out an address comparison in order to forward Ethernet telegrams. If no address entry exists within the switch for the target address of the received Ethernet telegram or the received Ethernet telegram is a multicast and/or a broadcast telegram, the received Ethernet telegram is transmitted via all interfaces. The interfaces are then blocked for maximum Ethernet data length, i.e. for 150 µsec at a data transmission rate of 100 Mbits/sec, which renders real-time processing at lower cycle times, such as 100 µsec, impossible. For the time-controlled switches, the time span of the maximum Ethernet data length, i.e. 150 µsec for a data transmission rate of 100 Mbits/sec, has to be reserved in each interface for Ethernet telegrams having the predetermined protocol-specific identification. Real-time applications having smaller cycle times and using any desired Ethernet protocol may thus not be carried out in this case, either.

In order to be able to carry out real-time control tasks by means of Ethernet telegrams without the use of switches in a simple and cost-efficient manner, DE 103 04 637 proposes to connect the participants provided for the real-time application to a ring-shaped transmission path, whereby this ring-shaped transmission path is connected to a network on which Ethernet telegrams may be transmitted via a network coupler. Thereby, the network coupler is configured in such a way that an Ethernet telegram received by the network via an external interface of the network coupler is forwarded to an internal interface and outputted onto the ring-shaped transmission path, whereby, while the Ethernet telegram passes through the ring-shaped transmission path, each participant connected to the ring-shaped transmission path exchanges the user data intended for the respective participant with the Ethernet telegram which passes through the transmission path.

In this network configuration, the ring-shaped transmission path comprising the network coupler and the participants connected to the transmission path via the network coupler appear as an individual Ethernet participant with regard to the network. The network coupler and the participants connected to the transmission path share one single Ethernet contact. By processing the Ethernet telegrams on the ring-shaped transmission path while passing through the participants connected thereto, the reaction time of the individual participants is significantly reduced so that control tasks may be carried out in real time by means of the cycling Ethernet telegrams. Particularly, it is also possible to address participants requiring only a few bytes of process data in a simple and cost-efficient manner by means of standard Ethernet telegrams which usually have a data length of several 100 bytes.

However, a problem in the ring-shaped network configuration occurs if a lot of participants are connected as delays may then occur during data processing which prevent real-time processing at very short cycle times. When passing through the individual participants as well as during forwarding between the participants, time delays in the order of magnitude of several hundred nanoseconds occur which in the case of a ring-shaped connection of more than 100 participants render cycle times of 50 µsec for real-time processing difficult. In order to avoid an excess-length string, DE 103 04 637 proposes to connect several shorter strings via a conventional address-comparing switch having a control computer, whereby a filter is additionally provided in each string which enables the filtering out of Ethernet telegrams which are not intended for participants connected via the string.

SUMMARY

The present invention generally relates to a packet switching device and a local communication network by means of which real-time control tasks having very short cycle times may be carried out in a simple and cost-efficient manner.

According to an embodiment, a packet switching device comprises a network interface configured to send and receive data packets via a communication network, a plurality of string interfaces configured to transmit and receive data packets to/from a plurality of participants and a switching unit connected to the network interface and to the plurality of string interfaces. The a switching unit comprises a control unit configured to control a data throughput. The control unit comprises an interface association table which determines that data packets received via the network interface are mandatorily outputted via the string interfaces and the data packets received via the string interfaces are mandatorily outputted via the network interface.

According to a further embodiment, a packet switching device comprises a network interface configured to send and receive data packets via a communication network, a plurality of string interfaces configured to transmit and receive data packets to/from a plurality of participants and a switching unit connected to the network interface and to the plurality of string interfaces, and configured to forward data packets received via the network interface to the string interfaces and to forward data packets received via the string interfaces to the network interface. The switching unit comprises an interface association table which determines that data packets received via the network interface are outputted via the string interfaces and data packets received via the string interfaces are outputted via the network interface. The switching unit further forwards data packets independently from an address of the data packets on the basis of the association of the interfaces determined in the interface association table.

According to a further embodiment, a local communications network comprising a packet switching device, the packet switching device comprising a network interface, a plurality of string interfaces and a switching unit connected to the network interface and to the plurality of string interfaces, the switching unit outputting data packets received via the network interface onto the string interfaces and data packets received via the string interfaces onto the network interface. Each string interface of the packet switching device is connected to a plurality of participants via a coupler. The participants are connected to the coupler in series via a ring-shaped transmission path and each being configured to interpret data packets passing through the ring-shaped transmission path and to carry out a data exchange.

According to a further embodiment, an Ethernet network comprises a packet switching device, the packet switching device comprising a network interface, a plurality of string interfaces and a switching unit connected to the network interface and to the plurality of string interfaces, the switching unit mandatorily outputting Ethernet telegrams received via the network interface onto the string interfaces and Ethernet telegrams received via the string interfaces onto the network interface. The network interface of the packet switching device is connected to a control computer and configured to send and receive Ethernet telegrams. Each string interface of the packet switching device is connected to a plurality of participants via a Ethernet coupler, the participants being connected to the Ethernet coupler in series via a ring-shaped transmission path and each being configured to interpret Ethernet telegrams passing through the ring-shaped transmission path.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Also, signal names used below are exemplary names, indicative of signals used to perform various functions in a given memory device. In some cases, the relative signals may vary from device to device. Furthermore, the circuits and devices described below and depicted in the figures are merely exemplary of embodiments of the invention. As recognized by those of ordinary skill in the art, embodiments of the invention may be utilized with any memory device.

Embodiments of the invention will be explained in more detail in conjunction with local communications networks (LANs). However, the invention may generally be used with any type of network.

By means of local communications networks (LANs), data and resources may be exchanged between work stations, generally referred to as computers or machines or, in the following, nodes or participants, in a simple manner and used jointly. Thereby, the Ethernet concept is the most widespread communication standard in the LAN.

In Ethernet networks, the plurality of nodes are connected to each other via a shared transmission medium, whereby an encapsulation of the data to be transmitted in so-called data packets, in the following also referred to as Ethernet telegrams, is carried out in a predetermined format.

The Ethernet consists of three areas, namely the transmission medium and the network interfaces, i.e. the hardware, the amount of protocols controlling access to the transmission medium and the Ethernet packet form. Thereby, the Ethernet basically represents a bus network, whereby any desired network topologies such as star, bus or tree networks may be used. In this context, Ethernet data transmission usually takes place by means of the CSMA/CD access method in which data transmission is carried out only when the network is quiet. Moreover, a collision-prevention mechanism is provided. The Ethernet data packet itself may thereby exhibit a data length of up to 1500 bytes, whereby the data are encapsulated by means of header and trailer which indicate an initial identification, the target and source address, the data packet type and the error recognition mechanism.

The Ethernet has established itself as a communications standard for network systems particularly in office communication, as standard hardware components and software protocols may be used and moreover high data transmission rates may be achieved. For this reason, it is desirable to use the Ethernet standard in an industrial environment during data transmission, particularly for control operations. The essential problem is the lack of real-time functionality of the Ethernet standard so that automation operations having real-time applications are usually carried out separately by the Ethernet communication networks within independent control modules, so-called field-bus systems.

Figure 1A:
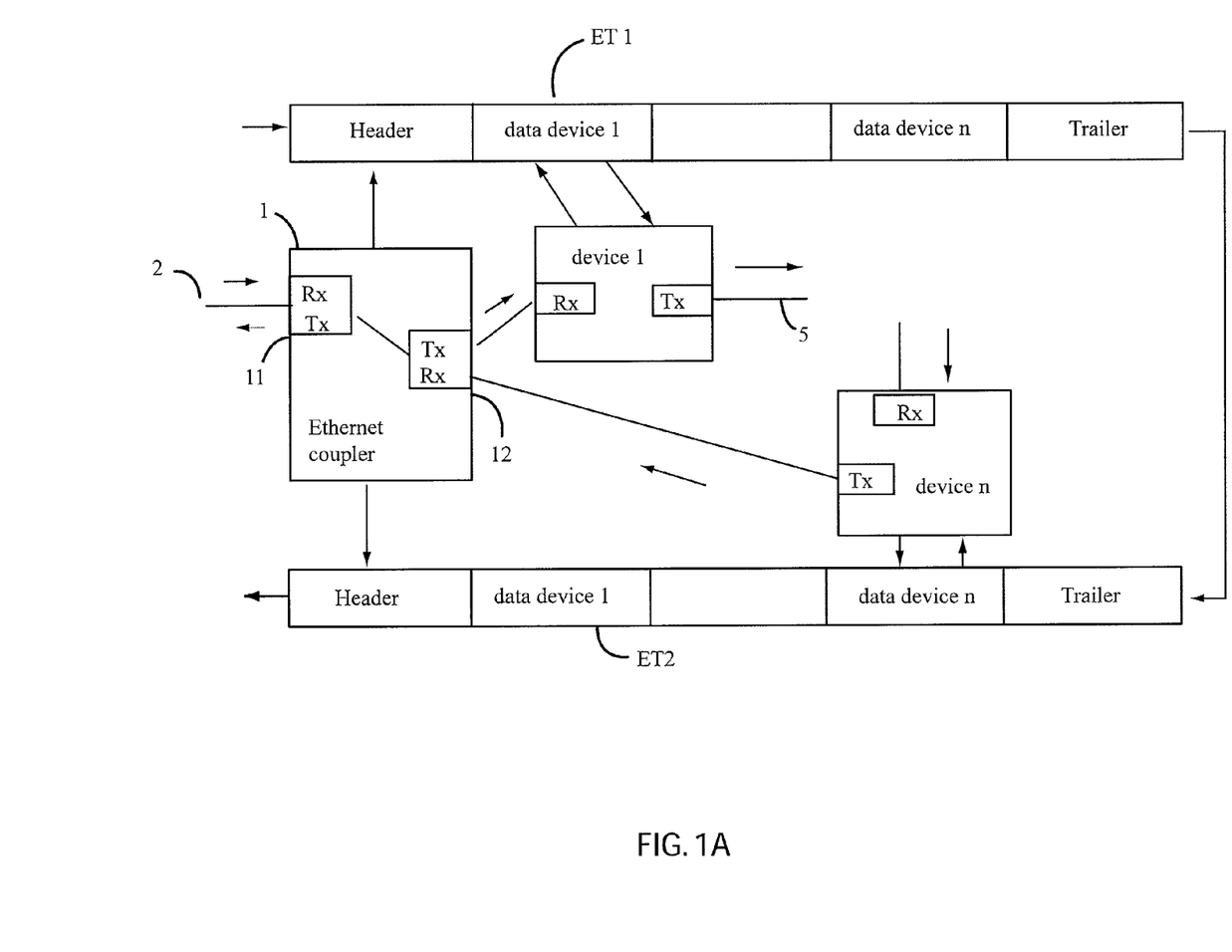
FIGS. 1A and 1B show a network coupler comprising participants connected to the network coupler in a ring-shape processing a circling Ethernet telegram, FIG. 1A indicating an embodiment having a ring conductor and FIG. 1B indicating an embodiment having a dual-channel conductor.

In order to be able to use the Ethernet standard and a correspondingly configured network also for carrying out automation tasks in a simple and cost-efficient manner, particularly such automation tasks, in which the individual participants involved in the control require process data of only a few bytes, a network coupler 1 as shown in FIG. 1A is provided, which in the following will also be referred to as Ethernet coupler and which comprises one external interface 11 for connecting to an Ethernet network. In the embodiment shown in FIG. 1A, the Ethernet coupler 1 with its external interface 11 is thereby connected to the Ethernet network via a transmission medium 2 which may be a coaxial cable, a twisted-pair cable or a glass-fibre cable.

The external interface 11 of the network coupler 1 is equipped with a receiving unit RX for receiving an Ethernet telegram from the network and with a transmitting unit TX for transmitting an Ethernet telegram on the network. FIG. 1A shows such an Ethernet telegram ET1 received by the Ethernet coupler 1 and an Ethernet telegram ET2 transmitted by the Ethernet coupler 1. Each of the two Ethernet telegrams ET1, ET2 consists of a header comprising the receipt identification and the target and source address, a data area as well as a trailer indicating the packet length, and an error recognition mechanism. The data area provided between the header and the trailer comprises the process data necessary for the control task, the process data preferably reflecting the entire process. These process data are in turn preferably grouped in data blocks required for the individual participants of the control task, i.e. for participant device 1 "data device 1" etc.

Moreover, the Ethernet coupler 1 is connected to a series of participants identified as device 1 to n via an internal interface 12 and via a ring-shaped transmission path 5. This ring-shaped transmission path 5 unites the participant devices 1 to n to create a ring topology, a transmitting unit TX of the internal interface 12 of the Ethernet coupler 1 being provided as data injection point and a receiving unit RX of the internal interface 12 of the Ethernet coupler 1 serving as a data extraction point.

The individual participants of the transmission path 5 are connected to form a daisy chain, each participant being connected to two neighbours, the first and the last participant in the daisy chain being connected to the Ethernet coupler 1. Data transmission takes place in one direction starting from the Ethernet coupler 1 to participant device 1 and from there up to participant device n and back to the Ethernet coupler 1. The direction of transmission is indicated in FIG. 1A by means of an arrow. For receiving the circling Ethernet telegram from the previous participant, each participant comprises an interface having a receiving unit RX, and an interface having a transmitting unit TX for forwarding to the subsequent participant.

In this process, the data exchange takes place as follows: the Ethernet telegram ET1 comprising the process data for the individual participants of the automation task, which has been applied to the transmission medium 2 by the Ethernet network, is received by the receiving unit RX of the external interface 11 which connects the network to the Ethernet coupler 1. The received Ethernet telegram is then forwarded from the external interface 11 to the internal interface 12, the transmitting unit TX of the internal interface 12 immediately outputting the Ethernet telegram onto the ring-shaped transmission path 5 without noteworthy delay.

Each participant connected to the ring-shaped transmission path 5 then extracts the process data intended for it from the circling Ethernet telegram (arrows in FIG. 1A), i.e. the participant device 1 extracts the "data device 1" etc., and then in turn inserts the process data resulting from the process execution into the corresponding location in the Ethernet telegram. The Ethernet telegram circling in such a way is then transmitted to the receiving unit RX of the internal interface 12 of the Ethernet coupler 1 after passing through the last participant device n, and from there it is forwarded to the external interface 11 which feeds the Ethernet telegram ET2 into the transmission medium 2 of the Ethernet network by means of the transmitting unit TX. The described data configuration of the circling Ethernet telegram is hereby merely exemplary.

The coupling of the participants of an automation task to the Ethernet network via an Ethernet coupler, the participants being connected via a ring structure, has the advantage that the devices connected to the Ethernet coupler are considered individual standard Ethernet participants by the Ethernet network. By means of the particular Ethernet connection in the Ethernet coupler, the Ethernet telegram received by the Ethernet coupler is outputted to the ring structure without noteworthy delay so that each participant may extract the data in the Ethernet telegram intended for it while the Ethernet telegram passes through the transmission ring and insert the respective data on its part. The advantages of this procedure consist in the fact that due to the processing of the Ethernet telegrams during a cycle no noteworthy delays occur during data processing and thus, short reaction times may be observed, as is required for real-time applications. A further advantage is that the Ethernet connection costs for each participant can be minimized since all connected participants share the Ethernet connection with the Ethernet coupler and due to the processing of the circling Ethernet telegram no powerful microcontrollers are required in the devices themselves.

Figure 1B:
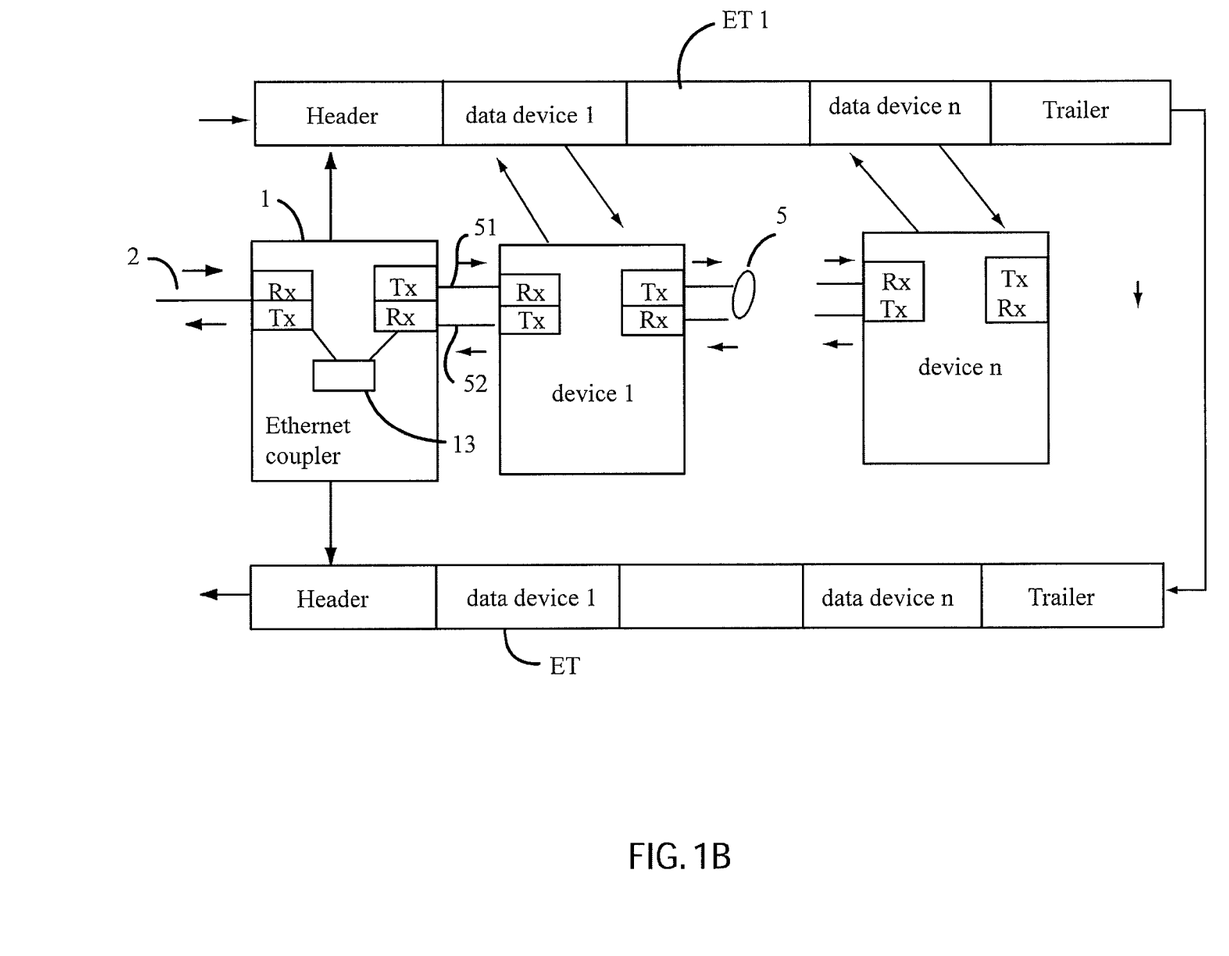

The ring-shaped transmission path may comprise simple and thus cheap transmission physics even with low coverage. Thus, e.g. a ribbon cable able to transmit LVDS signals may be used for the transmission path, or a fibre-optic cable instead of the complex twisted-pair or glass-fibre cable. If the transmission physics of the Ethernet networks differs from the ring-shaped transmission path, a processing unit 13 as shown in FIG. 1B is required in the Ethernet coupler 1 in order to transfer an Ethernet telegram from the transmission physics of the network to that of the ring-shaped transmission path 3. This processing unit 13 is arranged between the external interface 11 and the internal interface 12 of the Ethernet coupler 1. Furthermore, the processing unit 13 may carry out possibly necessary modifications to the Ethernet telegram in order to guarantee the Ethernet standard for Ethernet telegrams modified on the transmission path 5, e.g. by exchanging source and target address and re-calculating an Ethernet check sum.

In this context, FIG. 1B shows a further possible embodiment of the ring-shaped transmission path 3. Instead of a single-channel transmission path as shown in FIG. 1A, a dual-channel transmission path is provided in FIG. 1B. The transmission takes place in such a way that the Ethernet telegram comprising the process data which has been outputted on the transmission path 5 by the Ethernet coupler 1 is forwarded on a first channel 51 from participant device 1 to participant device n, each participant carrying out the desired data exchange during the cycle. The last connected participant device n then couples the processed Ethernet telegram back to a second channel 52, whereby each further participant located between the participant device n and the Ethernet coupler 1 merely forwards the Ethernet telegram. This embodiment allows for using the customarily employed full-duplex transmission path of the Ethernet network for the ring-shaped transmission path in order to connect the automation participant to the Ethernet coupler. Each participant comprises preferably two interfaces for forwarding the Ethernet telegrams to the full-duplex conductor, the interfaces comprising a transmitting unit TX and a receiving unit RX in a complementary manner in order to be able to transmit and/or receive on the first and the second channel.

In the network configuration having a ring-shaped transmission path in which the Ethernet coupler serves as an Ethernet connection at the input and the participants connected to the Ethernet coupler process the circling Ethernet telegrams, undesired delays may occur if the number of participants is too high, said delays affecting the real-time functionality of the network configuration. The fact is that each participant requires a certain cycle time for processing the telegrams, the cycle time depending upon the performance of the processing unit within the participant and amounting to an average of 200 nsec. In addition, delay times occur during the transmission of the Ethernet telegrams from one participant to the next so that in the case of 100 participants in the ring-shaped transmission path cycle times for real-time processing of less than 50 μsec are difficult to guarantee.

In order to be able to use the proposed simple and inexpensive ring-shaped transmission path comprising an Ethernet coupler as an Ethernet connection even with a high number of participants while at the same time reliably guaranteeing small cycle times of less than 100 μsec, the invention suggests to divide up the ring-shaped transmission path having a high number of participants into a plurality of strings and additionally to provide a packet switching device which will be referred to as "switch" in the following and which connects the individual strings to a control computer for executing real-time control tasks.

Figure 2:
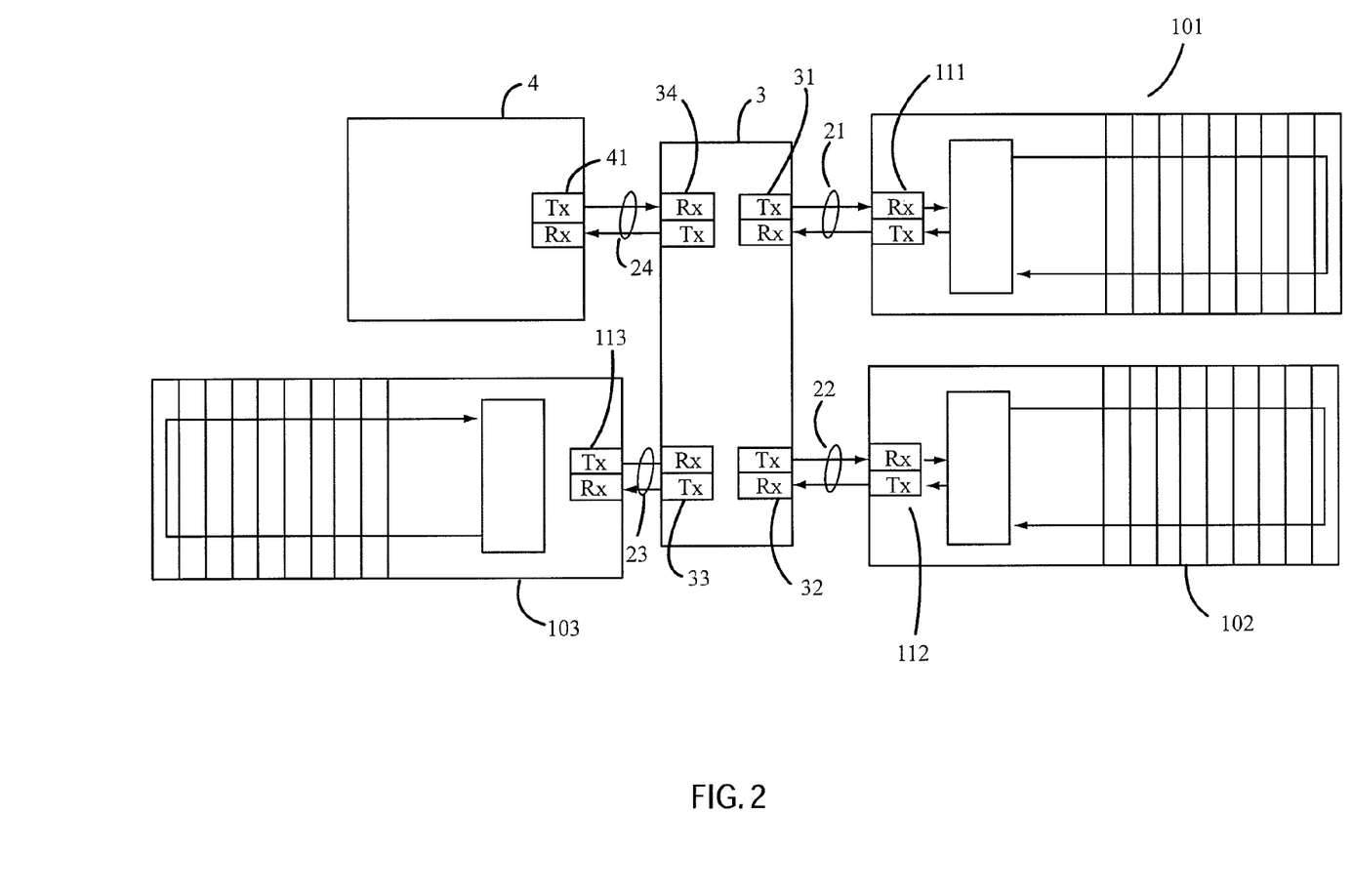
FIG. 2 illustrates an inventive network comprising a switch.

FIG. 2 shows such an Ethernet network configuration comprising three ring-shaped transmission strings 101, 102, 103, which are each designed according to the network configuration indicated in FIGS. 1A and 1B and which comprise an Ethernet coupler as an Ethernet connection and participants connected thereto in a ring-shaped manner. In this configuration, the Ethernet coupler and the participants are only schematically indicated, whereby the external interfaces 11, 112, 113 of the Ethernet coupler comprising the receiving unit Rx and the transmitting unit Tx, respectively, are shown. These external interfaces 111, 112, 113 are connected to the associated string interfaces 31, 32, 33 of a switch 3 via separate transmission paths of the transmission medium 2. The string interfaces 31, 32, 33 of the switch 3 each comprise a receiving unit Rx and a transmitting unit Tx, whereby the respective transmitting unit Tx of the string interface of the switch 3 is connected to the receiving unit Rx of the external interface of the ring-shaped string. The receiving unit Rx of the respective string interface of the switch 3 is in turn connected to the associated transmitting unit Tx of the external interface of the allocated ring-shaped string.

Apart from the string interfaces 31, 32, 33, the switch 3 comprises a further network interface 34 which is connected to a control computer 4 managing the real time tasks via a separate transmission path 24 of the transmission medium 2. As a counterpart thereto, the control computer 4 comprises a network interface 41 having a transmitting unit Tx and a receiving unit Rx. The transmitting unit Tx of the network interface 41 of the control computer 4 is thereby connected to the receiving unit Rx of the network interface 34 of the switch 3. The receiving unit Rx of the network interface 41 of the control computer 4 is connected to the receiving unit TX of the network interface 34 of switch 3. In this context, the network configuration shown in FIG. 2 is merely exemplary. The switch may comprise any number of string interfaces and a plurality of network interfaces, as well. Also, it is not mandatory that all string interfaces be occupied with ring-shaped strings and/or that all network interfaces be occupied with control computers. The transmission physics on the transmission paths between the string interfaces of the switch and the individual strings and the network interface of the switch and the control computer may differ in this configuration. Particularly, the transmission path between the control computer and the network interface of the switch may be configured for a higher transmission rate than the transmission rate present on the transmission paths between the string interfaces of the switch and the ring-shaped strings connected downstream.

Figure 3:
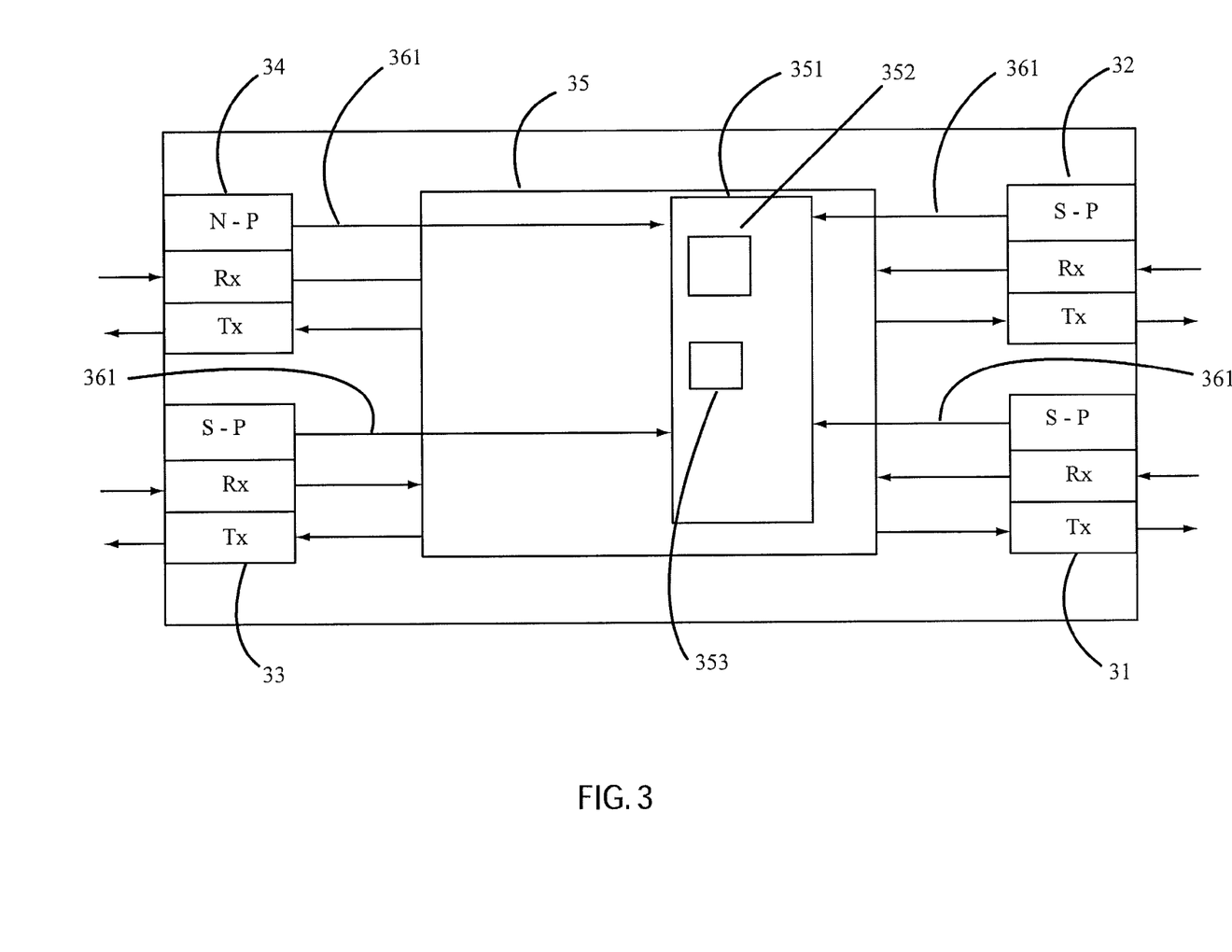
FIG. 3 shows a schematic view of an inventive switch.

The schematic view of FIG. 3 shows the configuration of switch 3. The string interfaces 31, 32, 33 and the network interface 34 are connected to a switching unit 35 via an internal conductor network. In FIG. 3, arrows schematically show the respective direction of data transmission between the interfaces 31, 32, 33, 34 and the switching unit 35. The switching unit 35 comprises a control unit 351 controlling the data throughput by means of the switch 3. The control unit 351 comprises an interface association table 352 which determines that Ethernet telegrams received via the network interface 34 are outputted to the connected ring-shaped strings 101, 102, 103 via the string interfaces 31, 32, 33 and that Ethernet telegrams received via the string interfaces 31, 32, 33 are fed back to the control computer 4 via the network interface 34.

This configuration of the switch allows for transmission of the Ethernet telegrams without delay between the control computer and the individual participants connected via the ring-shaped transmission paths, thus guaranteeing real-time processing of control tasks. By directly allocating the interfaces, a forwarding of the Ethernet telegrams through the switch can be guaranteed without address check and thus without time delay in order to safeguard the real-time functionality of the switch.

Moreover, in this configuration the control unit 351 may comprise a priority table 353 determining the order of priority when forwarding the data packets received by the string interfaces 31, 32, 33. The priority table 353 may be configured in such a way that when a plurality of string interfaces have the same priority, a decision is made on the basis of the address information of the Ethernet telegrams received via the individual string interfaces which telegram is prioritized and first forwarded to the network interface 34 for outputting on the control computer 4. Alternatively, however, a fixed algorithm may be provided which in the case of equivalent priority of the string interfaces determines which telegram is to be fed back to the control computer via the network interface first, without checking the address.

During the forwarding of the Ethernet telegrams, the switch 3 operates in such a way that the control unit 351 continuously checks the fill degree of the transmitting and receiving buffers in the network interface 34 and/or in the string interfaces 31, 32, 33. In FIG. 3, this query is indicated by data arrow 361. The control unit thereby checks the individual interfaces in the order of their priority, as it is determined in the priority table 353. At first, the network interface 34 is preferably examined and subsequently the string interfaces 31, 32, 33. If a receiving buffer is full, the control unit causes the switching unit 35 in the switch 3 to forward the telegrams from the receiving buffer of the corresponding interface to the transmitting buffer of the interface determined for outputting by the association table. The association is carried out in such a way that the Ethernet telegrams latched in the receiving buffer of the network interface 34 are forwarded to the transmitting buffers of the string interfaces 31, 32, 33. The Ethernet telegrams received in the receiving buffers of the string interfaces 31, 32, 33, on the other hand, are transmitted to the transmitting buffer of the network interface 34.

The examination of the receiving buffers of the string interfaces in the order determined by the priority table 353 provides that Ethernet telegrams from prioritized strings are first sent back to the control computer 4 via the network interface 34. It is thereby possible to also prioritize the string interfaces. If the string interfaces with equivalent priority then exhibit full receiving buffers, it may be determined on the basis of the address information of the Ethernet telegrams latched in the buffers which telegrams are to be forwarded first. Prior to the control unit 351 of the switching unit 35 in switch 3 forwarding the Ethernet telegram from the receiving buffer of one interface to the associated transmitting buffer of the other interface, the control unit 351 checks whether the transmitting buffer has sufficient storage space for receiving the data. If this is not the case, the control unit 351 provides that the transmitting procedure is initiated in order to empty the receiving buffer and in order to be able to receive the Ethernet telegrams to be forwarded.

By means of the inventive switch configuration, it is possible to exchange Ethernet telegrams independently from the Ethernet protocol and without delay and interface blocking between the control computer and the participants connected together in ring-shaped strings, thus realizing real-time applications with extremely short cycle times of even less than 10 μsec. The fixed allocation between the interfaces, in which the Ethernet telegrams received via the network interface are transmitted to the string interfaces without delay and in which, vice versa, the Ethernet telegrams received via the string interfaces are forwarded to the network interface without delay, provides maximally shortened forwarding times without unnecessary interface blocking. At the same time, it is possible to prioritize the individual string interfaces directly in order to be able to feed back the thus received Ethernet telegrams with maximally shortened cycle times.

In the control unit 351 of the switching unit 35 of switch 3, it is furthermore possible to carry out a time-controlled transmission procedure of the interfaces. This is particularly advantageous when a synchronized real-time processing is to be carried out by the participants. In this case, the control unit 351 provides that the transmitting buffer of the string interfaces 31, 32, 33, to which the Ethernet telegram received by the network interface 34 has been forwarded, simultaneously output the latched telegrams to the ring-shaped strings located downstream for further processing in the cycle. By means of this procedure, synchronous processing of the Ethernet telegram in all strings can be provided. The synchronous data output may take place in a time-controlled manner via a system clock in the switch.

As an alternative to the embodiment shown in FIG. 2, it is also possible to directly integrate the Ethernet couplers of the ring-shaped strings within the switch. The string interface in the switch is then configured as Ethernet coupler, the string interface then representing the internal interface of the network coupler to which the participants are connected in a ring-shaped manner. Moreover, the switching unit of the switch may also comprise a unit for transferring data packets from the transmission physics of the transmission path to the control computer into the transmission physics to the ring-shaped strings, and vice versa. The transmission path between the network interface of the switch and the control computer may thereby have a considerably higher transmission rate than the transmission path between the string interfaces of the switch and the ring-shaped strings connected downstream, as the string interfaces are operated in parallel and thus, data transmission does not involve any rate loss.

According to the invention, the packet switching device determines that the data packets received via the network interface are to be outputted via the string interfaces and the data packets received via the string interfaces are to be outputted via the network interface.

This configuration allows for the use of simple and cost-efficient ring-shaped participant networks and at the same time for the execution of real-time tasks having short cycle times for a plurality of participants. Interconnecting the packet switching device serves the purpose of avoiding excess-length strings and thus excess-length cycle times. At the same time, each delay or blocking of the interfaces in the packet switching device is prevented by the fixed interface allocation during data transmission, in which data packets received by the control computer on the network interface are mandatorily forwarded to the string interfaces and thus to the downstream strings, and data packets received at the string interfaces are fed back to the network interface and thus to the control computer. Since the cycle times for the Ethernet telegrams in the packet switching device are shortened to a maximum extent, the real-time functionality of the Ethernet network is guaranteed. The data packets are forwarded automatically and independently from address or protocol, thus not causing any time delays or blocks.

The packet switching device may provide that data packets received from the string interfaces are forwarded in a predetermined prioritized order. By prioritizing certain string interfaces, it is safeguarded that strings of participants carrying out particularly time-critical real-time tasks are preferred during data transmission. It is thereby possible to allocate the same priorities to a plurality of string interfaces whereby the prioritizing of the telegrams may be carried out on the basis of an address information of the received data packets.

The switching unit of the packet switching device may carry out a time-controlled transmission procedure, particularly a synchronous transmission procedure of the data packets to be sent via the string interfaces. This allows for precise control of real-time processing by means of the participants connected by the strings. At the same time, the network interface may be operated at a higher data transmission rate by means of the time-controlled parallel transmission procedure of the string interfaces.

What is claimed is:

1. A packet switching device comprising:
    a network interface configured to send and receive data packets via a communication network;
    a plurality of string interfaces configured to transmit and receive data packets to/from a plurality of participants; and
    a switching unit connected to the network interface and to the plurality of string interfaces, and configured to forward data packets received via the network interface to the string interfaces and to forward data packets received via the string interfaces to the network interface;
    wherein the switching unit comprises an interface association table which determines that data packets received via the network interface are outputted via the string interfaces and data packets received via the string interfaces are outputted via the network interface, and wherein the switching unit forwards data packets without an address check of the data packets independently from an address of the data packet on the basis of the association of the interfaces determined in the interface association table.

2. The packet switching device according to claim 1, wherein the switching unit carries out a time-controlled transmission of the data packets to be sent via the string interfaces.

3. The packet switching device according to claim 2, wherein the switching unit carries out a synchronous transmission of the data packets to be sent via the string interfaces.

4. The packet switching device according to claim 1, wherein the switching unit forwards data packets without a check of a content of the data packets exclusively on the basis of the association of the interfaces determined in the interface association table.

5. An Ethernet network comprising:
    a packet switching device, the packet switching device comprising a network interface, a plurality of string interfaces and a switching unit connected to the network interface and to the plurality of string interfaces, the switching unit mandatorily outputting Ethernet telegrams received via the network interface onto the string interfaces and Ethernet telegrams received via the string interfaces onto the network interface, wherein the switching unit forwards data packets independently from an address of the data packets and independently from a protocol on the basis of the association of the interfaces determined in the interface association table;
    wherein the network interface is connected to a control computer and configured to send and receive Ethernet telegrams; and
    wherein each string interface is connected to a plurality of participants via a Ethernet coupler, the participants being connected to the Ethernet coupler in series via a ring-shaped transmission path and each being configured to interpret Ethernet telegrams passing through the ring-shaped transmission path.

6. The Ethernet network according to claim 5, wherein the Ethernet coupler comprises an external interface for connecting the associated string interface of the packet switching device and an internal interface for connecting in series the plurality of participants to the ring-shaped transmission path.

7. The Ethernet network according to claim 5, wherein between the external interface and the internal interface the Ethernet coupler comprises a unit for transferring Ethernet telegrams between the transmission physics of the network and the transmission physics of the ring-shaped transmission path.

8. The Ethernet network according to claim 5, wherein the packet switching device forwards Ethernet telegrams independently from an address of the Ethernet telegrams on the basis of an interface association table which determines that Ethernet telegrams received via the network interface are outputted via the string interfaces and the Ethernet telegrams received via the string interfaces are outputted via the network interface.

9. The Ethernet network according to claim 5, wherein the switching unit forwards data packets independently from an address of the data packets and independently from a protocol exclusively on the basis of the association of the interfaces determined in the interface association table.

10. A packet switching device comprising:
- a network interface configured to send and receive data packets via a communication network, the network interface comprising a receiving buffer and a transmitting buffer;
- a plurality of string interfaces configured to transmit and receive data packets to/from a plurality of participants, each string interface comprising a receiving buffer and a transmitting buffer; and
- a switching unit connected to the network interface and to the plurality of string interfaces and comprising a control unit configured to control a data throughput of the data packets, the control unit comprising an interface association table which determines that the data packets received via the network interface are mandatorily outputted via the string interfaces and the data packets received via the string interfaces are mandatorily outputted via the network interface, wherein the control unit continuously checks a fill degree of the receiving buffers of the network interface and of the string interfaces, and, if a receiving buffer is full, causes the switching unit to forward the data packets from the filled receiving buffer of the corresponding interface to the transmitting buffer of the interface determined for outputting by the interface association table.

11. A local communications network comprising a packet switching device, the packet switching device comprising a network interface, a plurality of string interfaces and a switching unit connected to the network interface and to the plurality of string interfaces, the switching unit outputting data packets received via the network interface onto the string interfaces and data packets received via the string interfaces onto the network interface without an address check of the data packets, wherein each string interface is connected to a plurality of participants via a coupler, the participants being connected to the coupler in series via a ring-shaped transmission path and each being configured to interpret data packets passing through the ring-shaped transmission path and to carry out a data exchange, and wherein the switching unit outputs data packets received via the network interface onto the string interfaces and data packets received via the string interfaces onto the network interface without an address check of the data packets exclusively on the basis of an association of the interfaces determined in an interface association table.

12. The communications network according to claim 11, wherein the switching unit comprises an interface association table which determines that the data packets received via the network interface are mandatorily outputted via the string interfaces and the data packets received via the string interfaces are mandatorily outputted via the network interface.

13. The communications network according to claim 11, wherein the coupler comprises an external interface for connecting the associated string interface of the packet switching device and an internal interface for connecting in series the plurality of participants to the ring-shaped transmission path.

14. The communications network according to claim 11, wherein between the external interface and the internal interface the coupler comprises a unit for transferring data packets between the transmission physics of the network and the transmission physics of the ring-shaped transmission path.

\* \* \* \* \*